United States Patent
Cho (10) Patent No.: US 11,463,153 B2
(45) Date of Patent: Oct. 4, 2022

(54) MILLIMETERWAVE REPEATER AND DISTRIBUTED ANTENNA SYSTEM FOR POWER TRANSMISSION

(71) Applicant: ADRF KOREA, Inc., Icheon-si (KR)

(72) Inventor: Chan Ki Cho, Icheon-si (KR)

(73) Assignee: ADRF KOREA, Inc., Icheon-si (KR)

( * ) Notice: Subject to any disclaimer, the term of this patent is extended or adjusted under 35 U.S.C. 154(b) by 0 days.

(21) Appl. No.: 17/174,697

(22) Filed: Feb. 12, 2021

(65) Prior Publication Data
US 2022/0224399 A1 Jul. 14, 2022

(30) Foreign Application Priority Data
Jan. 11, 2021 (KR) .................. 10-2021-0003088

(51) Int. Cl.
 *H04B 7/155* (2006.01)
 *H04B 7/026* (2017.01)
(52) U.S. Cl.
 CPC ......... *H04B 7/15507* (2013.01); *H04B 7/026* (2013.01)
(58) Field of Classification Search
 USPC ....................................................... 370/315
 See application file for complete search history.

(56) References Cited

U.S. PATENT DOCUMENTS

| | | | | |
|---|---|---|---|---|
| 11,152,991 | B2* | 10/2021 | Ashrafi | H01Q 21/065 |
| 2012/0235636 | A1* | 9/2012 | Partovi | H04B 5/0081 |
| | | | | 320/108 |
| 2017/0141621 | A1* | 5/2017 | Zeine | H02J 50/40 |
| 2020/0007223 | A1* | 1/2020 | Zhu | H04B 7/15542 |
| 2020/0280127 | A1* | 9/2020 | Hormis | H04B 7/155 |
| 2020/0322037 | A1* | 10/2020 | Abedini | H04W 52/42 |
| 2020/0336168 | A1* | 10/2020 | Hormis | H03L 7/22 |
| 2020/0367257 | A1* | 11/2020 | Hormis | H04W 72/082 |
| 2020/0382208 | A1* | 12/2020 | Hormis | H04B 7/086 |
| 2021/0126702 | A1* | 4/2021 | Kohavi | H04B 7/15535 |

FOREIGN PATENT DOCUMENTS

KR 102049584 B1 1/2020

* cited by examiner

*Primary Examiner* — Gregory B Sefcheck
*Assistant Examiner* — Majid Esmaeilian
(74) *Attorney, Agent, or Firm* — Dinsmore & Shohl LLP; Yongsok Choi, Esq.

(57) ABSTRACT

Provided is a distributed antenna system using a millimeterwave repeater. The distributed antenna system includes a donor unit configured to receive a downlink millimeter band radio frequency (RF) signal from a gNodeB base station, sum the received RF signal with a communication signal, and a synchronization signal to generate a summation signal, and transmit the summation signal; a transmission unit configured to transmit the summation signal and a power signal for power supply; and a server unit configured to receive the summation signal, separate and amplify the summation signal to transmit an RF signal to a user terminal. Only one of the donor unit and the server unit includes a power supply unit configured to generate the power signal.

1 Claim, 6 Drawing Sheets

MILLIMETERWAVE REPEATER AND DISTRIBUTED ANTENNA SYSTEM FOR POWER TRANSMISSION

CROSS-REFERENCE TO RELATED APPLICATION

This application claims priority to Korean Patent Application No. 10-2021-0003088 filed on Jan. 11, 2021, the entire contents of which are herein incorporated by reference.

TECHNICAL FIELD

The disclosure relates to a millimeterwave repeater and a distributed antenna system for power transmission. More particularly, the disclosure relates to a distributed antenna system using a millimeterwave repeater capable of maintaining a millimeterwave band service by enabling a repeater to be installed in a place where power supply is difficult.

BACKGROUND ART

Millimeterwave band repeaters and distributed antenna systems may be classified into integrated products and separate products according to service ranges. In contrast with integrated products, separate products include a donor unit that receives a signal from a base station, and a server unit that transmits a signal to a user terminal. A millimeter wave repeater and a distributed antenna system divided into a donor unit and a server unit as described above independently include a signal line for transmitting a radio frequency (RF) supplied from a distributed system and a power supply line for operating the millimeterwave repeater or the distributed antenna system. Because the donor unit of a millimeterwave repeater and a distributed antenna system is installed in a location or space where power supply or installation of a plurality of cables is difficult, such as the rooftop of a building, a campus, or a playground, inconveniences and problems in installation, such as having to install a pole for power supply or leading in a power supply line by a long distance within a building are generated.

To address this problem, a millimeterwave repeater and a distributed antenna system for power transmission and supply having a new structure is demanded.

PRIOR ART DOCUMENTS

Patent Document (Patent document 0001) KR 10-2049584

DETAILED DESCRIPTION

Technical Problem

Provided is a signal transmission method and device of a millimeterwave repeater and a distributed antenna system for transmitting and supplying power together with a radio frequency (RF) signal, which is a millimeterwave band signal, and a communication (CM) signal and a synchronization (Sync) signal from a server unit to a donor unit or from the donor unit to the server unit.

Provided is a method enabling a donor unit and a server unit to each use a transmission line for transmitting an RF signal, a CM signal, and a Sync signal, and a power line for power supply when a millimeterwave repeater or a distributed antenna system is implemented as a separate type.

Provided is a millimeterwave band relay service provided to even a place where no power equipment is provided, by supplying an RF signal (AC), a CM signal (AC), and a Sync signal (AC) together with power (DC) from a donor unit or a server unit through an RF signal supply cable, in order to install a millimeterwave repeater and a distributed antenna system in a region where it is difficult to supply power to the donor unit or the server unit.

Technical problems of the disclosure are not limited to the contents mentioned above, and other technical problems not mentioned will be clearly understood by one of ordinary skill in the art from the following description.

Solution to Problem

According to an embodiment of the disclosure, a distributed antenna system using a millimeterwave repeater. The distributed antenna system includes a donor unit configured to receive a downlink millimeter band radio frequency (RF) signal from a gNodeB base station, sum the received RF signal with a communication signal, and a synchronization signal to generate a summation signal, and transmit the summation signal; a transmission unit configured to transmit the summation signal and a power signal for power supply; and a server unit configured to receive the summation signal, separate and amplify the summation signal to transmit an RF signal to a user terminal. Only one of the donor unit and the server unit includes a power supply unit configured to generate the power signal.

The power signal generated by the power supply unit may be transmitted together with the summation signal through the transmission unit.

The donor unit may include a first signal processing module and a second signal processing module for processing signals respectively received through a first multiple input multiple output (MIMO) antenna and a second MIMO antenna for MIMO.

The transmission unit may include a first transmission unit for transmitting a first summation signal generated by the first signal processing module of the donor unit and the power signal, and a second transmission unit for transmitting a second summation signal generated by the second signal processing module of the donor unit.

The transmission unit may be formed of a single line, and a first summation signal generated by the first signal processing module of the donor unit may be transmitted together with the power signal through the transmission unit, and a second summation signal generated by the second signal processing module of the donor unit may be transmitted without the power signal through the transmission unit.

Advantageous Effects of Disclosure

According to an embodiment of the disclosure, provided is a signal transmission method and device of a millimeterwave repeater and a distributed antenna system for transmitting and supplying power together with a radio frequency (RF) signal, which is a millimeterwave band signal, and a communication (CM) signal and a synchronization (Sync) signal from a server unit to a donor unit or from the donor unit to the server unit.

In addition, according to an embodiment of the disclosure, because a single transmission line or a minimum transmission line is used to transmit a millimeterwave band signal, a millimeterwave band signal relay service having a cost reduction effect and convenience of installation is provided.

Effects of the disclosure are not limited to the contents mentioned above, and other effects not mentioned will be clearly understood by one of ordinary skill in the art from the following description.

DETAILED DESCRIPTION OF DISCLOSURE

Embodiments of the disclosure are described in detail herein with reference to the accompanying drawings so that this disclosure may be easily performed by one of ordinary skill in the art to which the disclosure pertains. The disclosure may, however, be embodied in many different forms and should not be construed as being limited to the embodiments set forth herein. In the drawings, parts irrelevant to the description are omitted for simplicity of explanation.

The terms used in the disclosure are merely used to describe particular embodiments, and are not intended to limit the scope of the disclosure. An expression used in the singular may encompass the expression of the plural, unless it has a clearly different meaning in the context.

In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In addition, the components shown in the embodiments of the present disclosure are shown independently to indicate different characteristic functions, and thus do not mean that each component is composed of separate hardware or one software component unit. In other words, for convenience of description, each component is listed as each component, and at least two components may be combined to form one component, or one component may be divided into a plurality of components to perform a function. An embodiment in which at least two components may be combined to form one component, and an embodiment in which one component is divided into a plurality of components are also included in the scope of the present disclosure without departing from the essence of the present disclosure.

Embodiments of the disclosure will now be described more fully with reference to the accompanying drawings.

Figure 1:
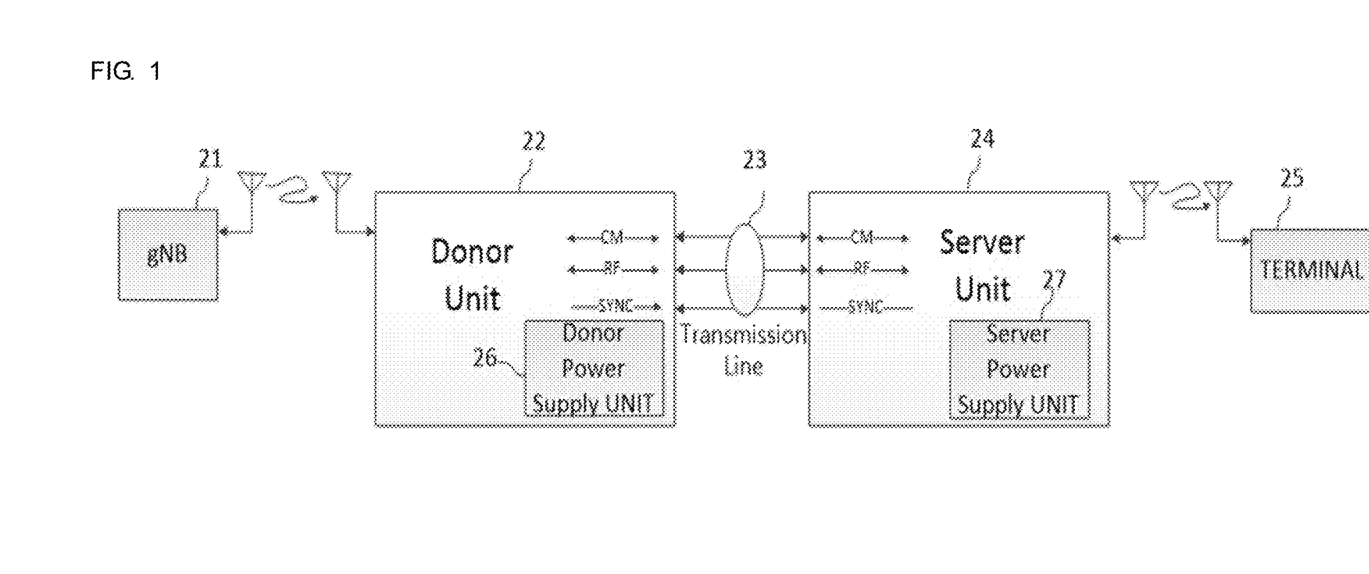
FIG. 1 is an exemplary diagram for explaining a structure of a signal transmission method and device of a conventional millimeterwave repeater.

FIG. 1 is an exemplary diagram for explaining a structure of a signal transmission method and device of a conventional millimeterwave band repeater.

FIG. 1 illustrates a signal transmission and power supply method performed by a conventional millimeterwave band repeater 1. In the signal transmission and power supply method, a signal received from a gNB 21 is subjected to frequency separation and change through a donor unit 22. The gNB 21 means a gNodeB, and in the $3^{rd}$ Generation Partnership Project (3GPP), a 5G New Radio (NR) base station is referred to as gNodeB in distinction from eNodeB, which is an LTE base station of existing $4^{th}$ generation (4G) mobile communication.

Referring to FIG. 1, a downlink radio frequency (RF) signal input to a donor unit 22 is added to a communication (CM) signal, a reference signal, and a synchronization (Sync) signal or may be transmitted separately to a server unit 24 through a separate transmission path 23. Power supply of the donor unit 22 is conducted through a donor power supply unit 26, which is a separate power supply device provided within the donor unit 22, without passing through a transmission path.

The RF signal, the CM signal, the reference signal, and the Sync signal are transmitted through individual transmission paths 23, respectively. The downlink RF signal, the CM signal, the reference signal, and the Sync signal transmitted through the transmission paths 23 are separately provided to a phase lock loop (PLL) or a Sync module, in the server unit 24, and the RF signal undergoes signal separation and suitable amplification and is wirelessly transmitted to a user terminal 25 through RF amplification.

Power supply of the server unit 24 is performed through a server power supply unit 27 provided in the server unit 24.

A flow of an uplink signal may be conducted from the server unit 24 to the gNB 21 through the donor unit 22 in a reverse order to the above-described flow of the downlink signal.

As described above, the conventional millimeterwave repeater and distributed antenna system is configured such that the donor power supply unit 26 and the server power supply unit 27 are disposed at respective locations. In a signal transmission method of the conventional millimeterwave repeater 1, because the donor unit 22 and the server unit 24 use individual power, there is a limit in repeater installation in places where power supply is impossible.

Figure 2:
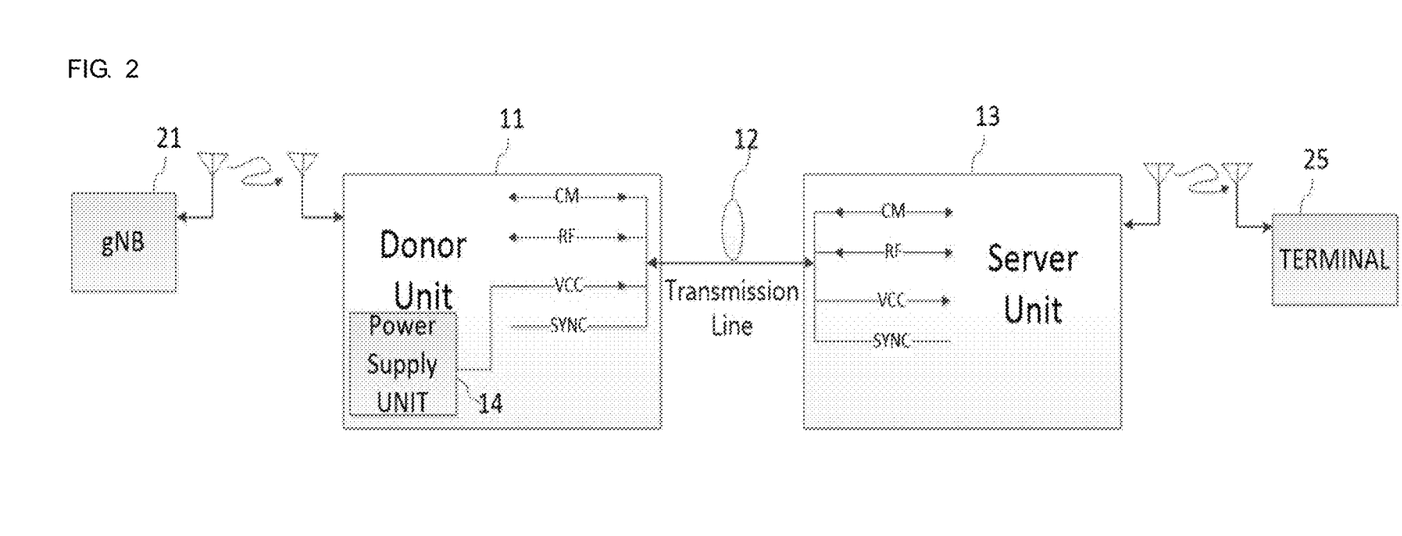
FIG. 2 is an exemplary diagram for explaining a structure of a signal transmission method and device of a millimeterwave repeater according to an embodiment of the disclosure, and illustrates a structure in which a donor unit supplies power.

FIG. 2 is an exemplary diagram for explaining a structure of a signal transmission method and device of a millimeterwave repeater according to an embodiment of the disclosure, and illustrates a structure in which a donor unit supplies power.

Referring to FIG. 2, when a downlink millimeter band signal received from the gNB 21, which is a 5G base station, is input to a donor unit 11, the input downlink RF signal may be summed with a CM signal, a reference signal, and a Sync signal to generate a summation signal, and the generated summation signal may be transmitted to a server unit 13 through a transmission unit 12. Power supply of the donor unit 11 may be conducted through a power supply unit 14 provided in the donor unit 11, and the donor unit 11 may use power and transmit a power signal to the server unit 13 through the transmission unit 12 so as to supply power.

As described above, in the downlink signal flow, the donor unit 11 may transmit the RF signal, the CM signal, the reference signal, and the Sync signal together with the power signal to the server unit 13 through the transmission unit 12.

The RF signal, the CM signal, the reference signal, the Sync signal, and the power signal transmitted to the server unit 13 through the transmission unit 12 may be separated from one another and provided to a PLL or a Sync module, the power signal is separated from the RF signal and provided to an RF unit and a control unit of the server unit 13, and the RF signal may undergo signal separation and suitable amplification and may be wirelessly transmitted to the user terminal 25 through RF amplification.

In a reverse order to the downlink signal flow, an uplink signal flow may be conducted from the server unit 13 to the gNB 21 through the donor unit 11.

According to an embodiment of the disclosure, repeater installation places may not be interrupted through a millimeterwave repeater and a distributed antenna system having a structure as described above.

Figure 3:
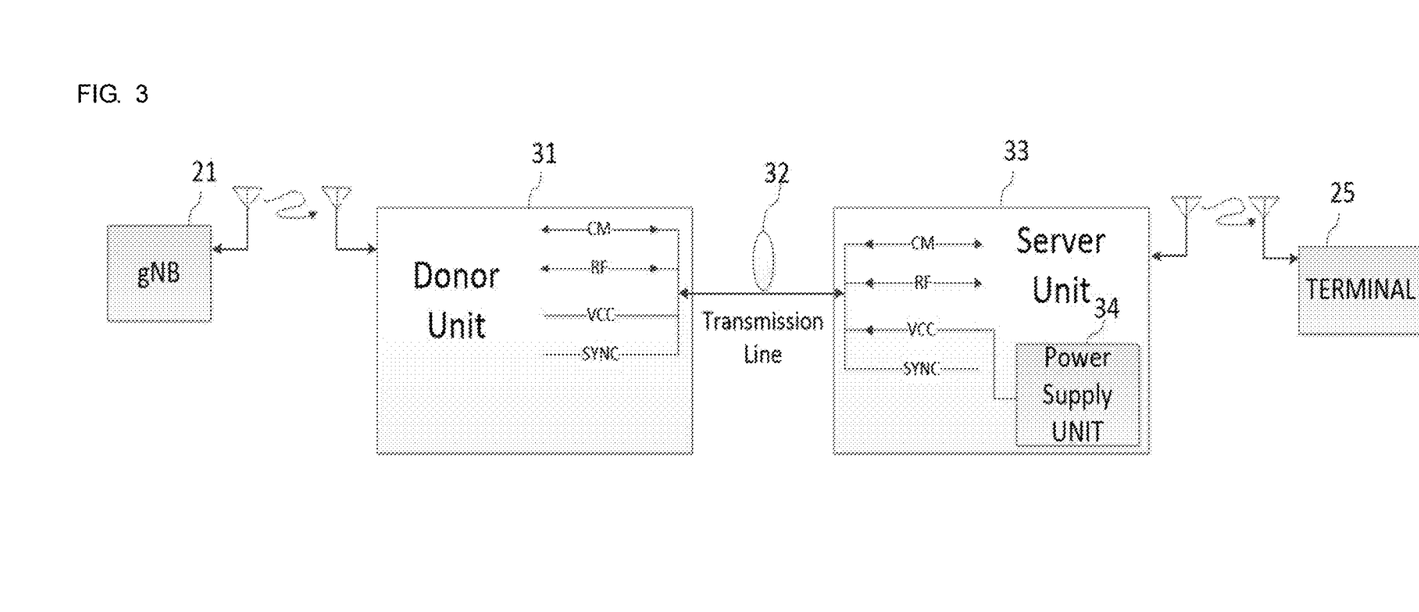
FIG. 3 is an exemplary diagram for explaining a structure of a signal transmission method and device of a millimeterwave repeater according to an embodiment of the disclosure, and illustrates a structure in which a server unit supplies power.

FIG. 3 is an exemplary diagram for explaining a structure of a signal transmission method and device of a millimeterwave repeater according to an embodiment of the disclosure, and illustrates a structure in which a server unit supplies power.

Referring to FIG. 3, when a downlink millimeter band signal received from the gNB 21 is input to a donor unit 31, the input downlink RF signal may be summed with a CM signal, a reference signal, and a Sync signal to generate a summation signal, and the generated summation signal may be transmitted to a server unit 33 through a transmission unit 32. At this time, power supply of the donor unit 31 may be conducted through a power supply unit 34 included in the server unit 33 and through the transmission unit 32. The reference signal refers to a reference signal for driving a PLL for converting an RF to an intermediate frequency (IF), and is used in each of the donor unit 31 and the server unit 33.

As described above, the donor unit 31 may transmit the RF signal, the CM signal, the reference signal, and the Sync signal to the server unit 33 through the transmission unit 32, and the power signal may be transmitted to the transmission unit 32 through the power supply unit 34 of the server unit 33.

The server unit 33 may separate the RF signal, the CM signal, the reference signal, and the Sync signal received through the transmission unit 32 and provide the separated signals to a PLL or a Sync module, and the RF signal may undergo signal separation and suitable amplification and may be wirelessly transmitted to the user terminal 25 through RF amplification. Power may be supplied to an RF unit and a control unit through the power supply unit 34 of the server unit 33, and may be transmitted to the transmission unit 32 to be provided to the donor unit 31.

An uplink signal flow may be performed from the server unit 33 to the gNB 21 through the donor unit 31 in a reverse order to the above-described downlink signal flow.

According to an embodiment of the disclosure, repeater installation places may not be interrupted through a millimeterwave repeater and a distributed antenna system having a structure as described above.

Figure 4:
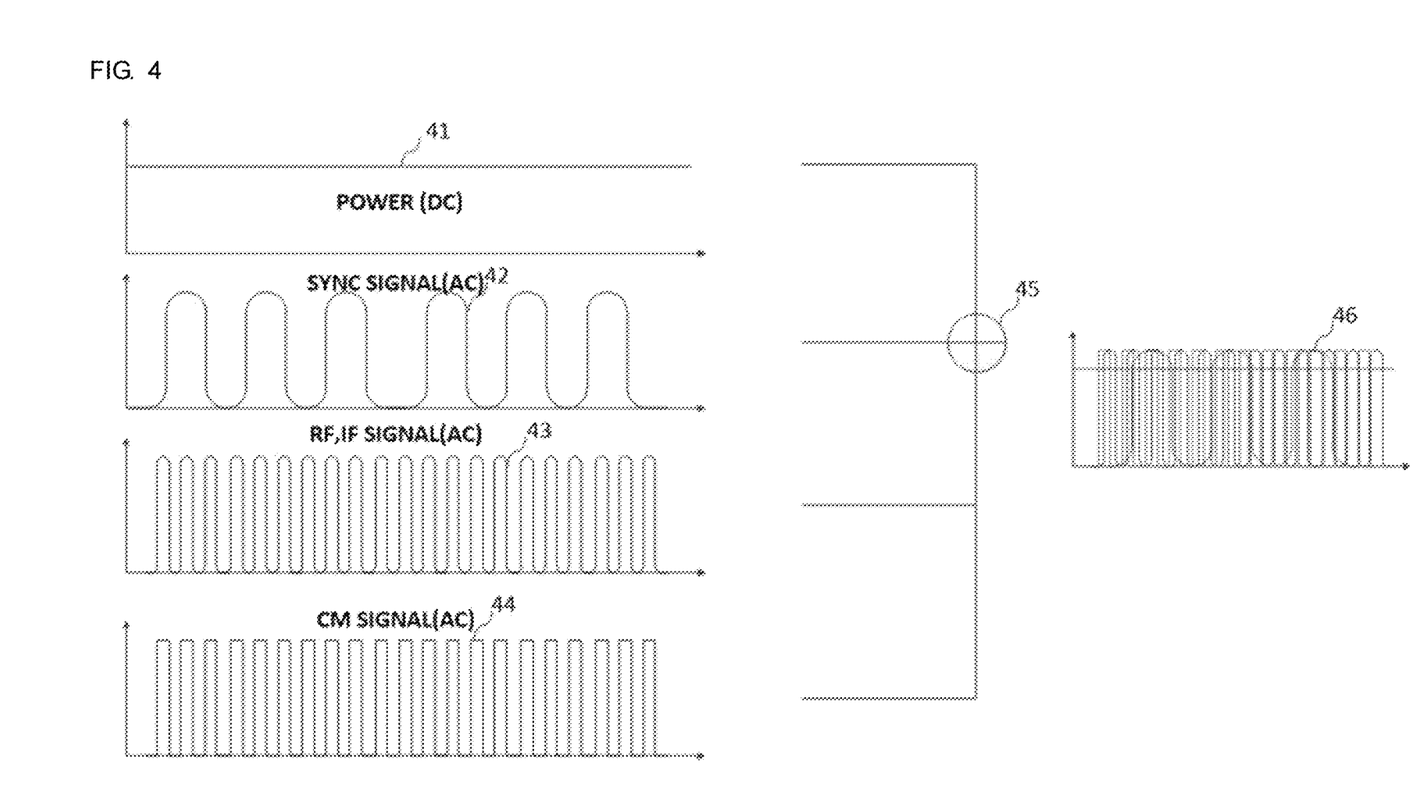
FIG. 4 is a diagram for explaining a method of generating a summation signal, according to an embodiment of the disclosure.

FIG. 4 is a diagram for explaining a method of generating a summation signal, according to an embodiment of the disclosure.

FIG. 4 illustrates a structure for generating a summation signal 46 through a summer 45 configured to sum a power signal (DC) 41, a Sync signal (AC) 42, an RF, IF signal (AC) 43, and a CM signal 44 all together, in order to describe generation of a summation signal in detail. In FIG. 4, the generated summation signal 46 may be transmitted through the transmission units 12 and 32 between the donor units 11 and 31 and the server units 13 and 33.

Figure 5:
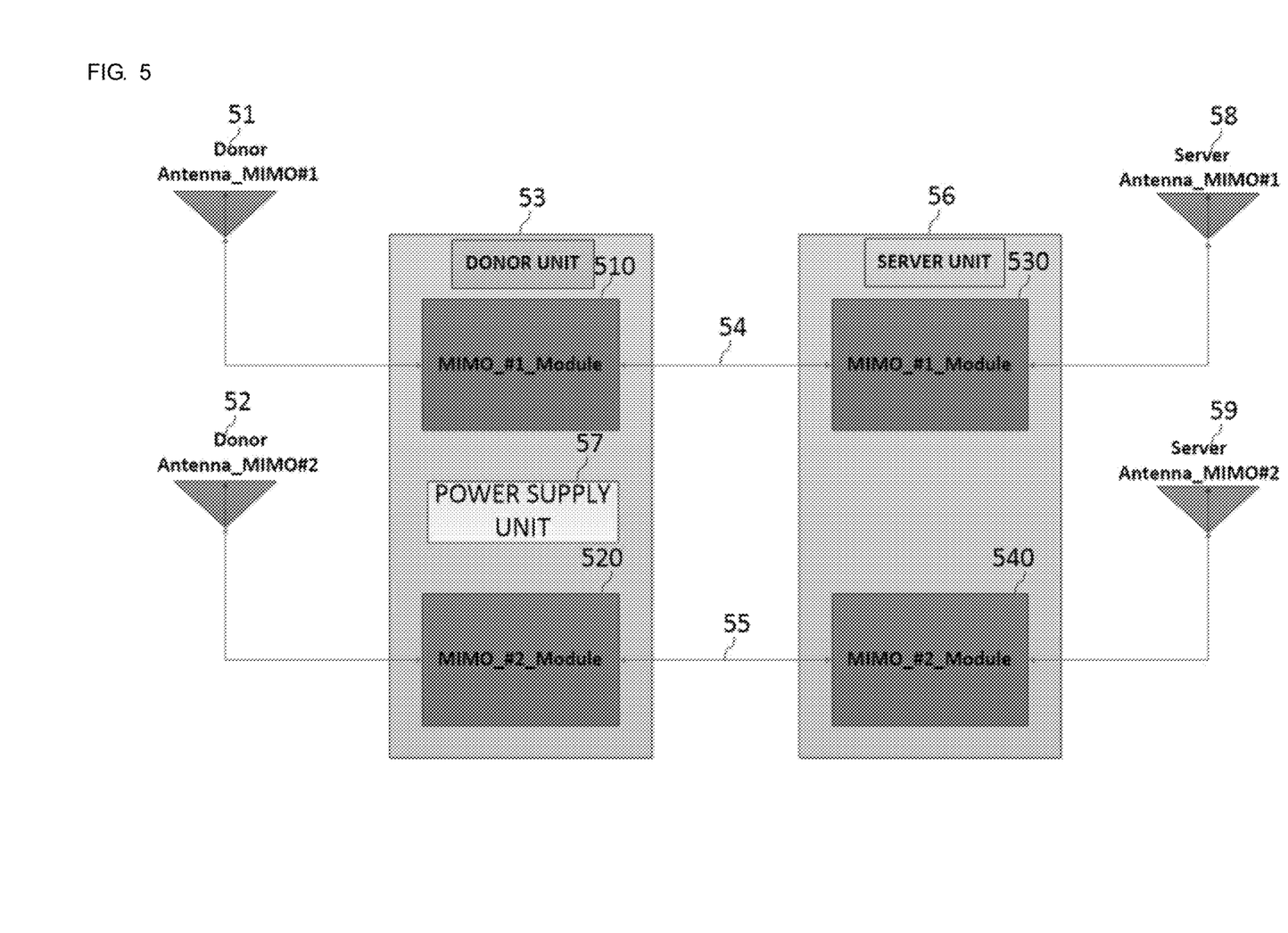
FIG. 5 is a block diagram for explaining a signal transmission method and device of a multiple input multiple output (MIMO) millimeterwave repeater according to another embodiment of the disclosure.

FIG. 5 is a block diagram for explaining a signal transmission method and device of a Multiple Input Multiple Output (MIMO) millimeterwave repeater according to an embodiment of the disclosure.

FIG. 5 illustrates a millimeterwave repeater and millimeterwave distributed antenna system having an MIMO structure. In the millimeterwave repeater and millimeterwave distributed antenna system, a signal input to a Donor_MIMO_#1 antenna 51, which is a first MIMO antenna, may be summed with an IF frequency, a CM signal, a reference signal, a SYNC signal, and a power signal of a power supply unit 57 through a MIMO_#1_Module 510, which is a first signal processing module of a donor unit 53, and a signal corresponding to a result of the summation may be transmitted to a server unit 56 through a first transmission unit 54. The signal received through the first transmission unit 54 is divided into the IF signal, the CM signal, the reference signal, and the Sync signal necessary for driving a MIMO_#1_Module 530, which is a first signal processing module of the server unit 56, and may be provided to a PLL or a Sync module, and the RF signal may undergo signal separation and suitable amplification and may be wirelessly transmitted to a user terminal 58 through RF amplification.

A signal input to a Donor_MIMO_#2 antenna 52, which is a second MIMO antenna, is summed with signals excluding a power signal through a MIMO_#2_Module 520, which is a second signal processing module of the donor unit 53, and a signal corresponding to a result of the summation may be transmitted to the server unit 56 through a second transmission unit 55. The signal transmitted through the second transmission unit 55 may be converted into an RF signal through a MIMO_#2_Module 540, which is a second signal processing module of the server unit 56, and the RF signal may undergo signal separation and suitable amplification and may be wirelessly transmitted to a user terminal 59 through RF amplification.

Referring to FIG. 5, the two or more transmission units 54 and 55 may be included between the donor unit 53 and the server unit 56, and the transmission units 54 and 55 may be configured to transmit summation signals in correspondence to respective MIMO antennas and respective signal processing modules, respectively. According to communication environments or user's requests, power may be supplied through a single line, or power may be supplied to two or more lines, namely, the first transmission unit 54 and the second transmission unit 55.

Although the power supply unit 57 is included in the donor unit 53 in FIG. 5, the power supply unit 57 may be included in the server unit 56 to supply power, similar to FIG. 3.

Figure 6:
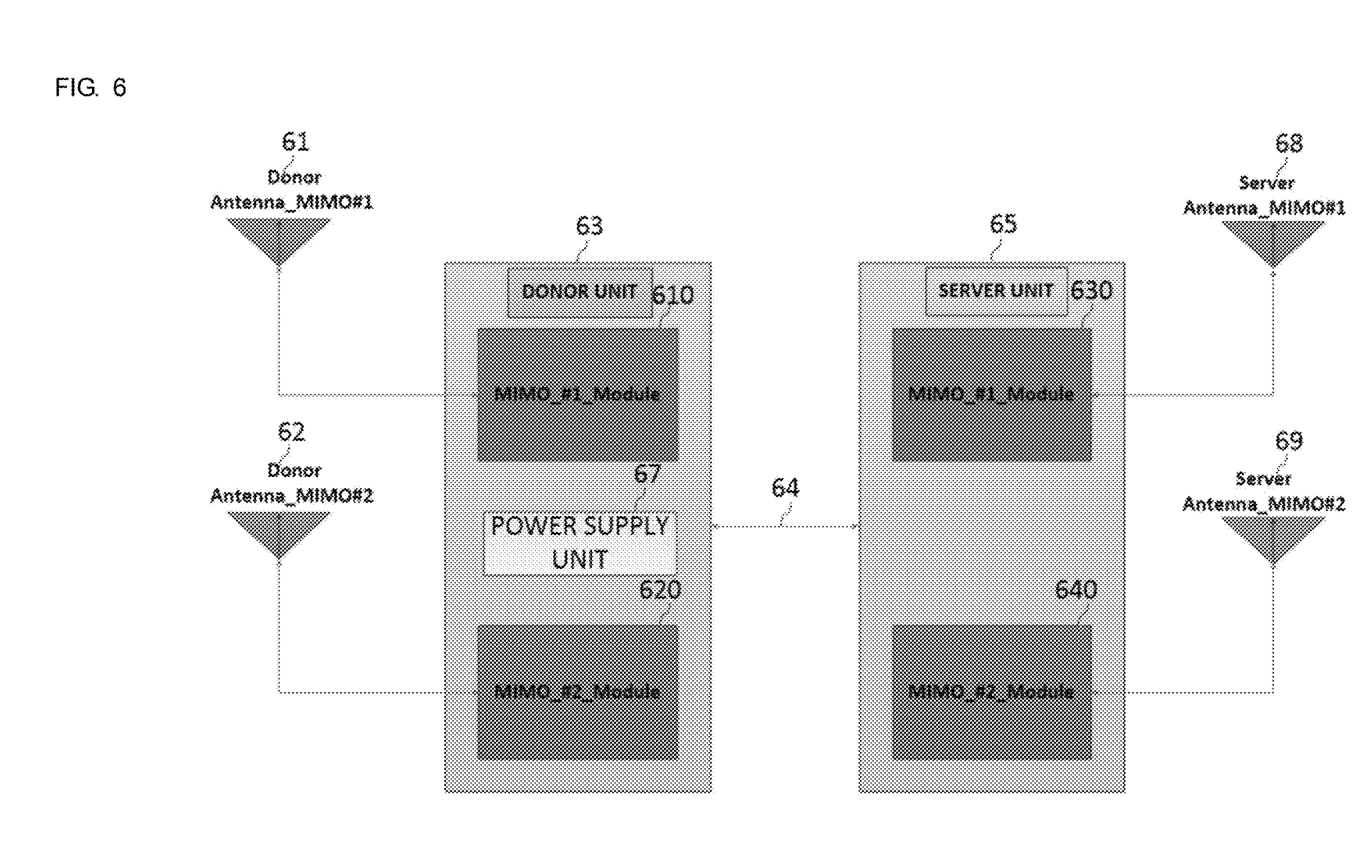
FIG. 6 is a block diagram for explaining a signal transmission method and device of a MIMO millimeterwave repeater according to another embodiment of the disclosure.

FIG. 6 is a block diagram for explaining a signal transmission method and device of a MIMO millimeterwave repeater according to another embodiment of the disclosure.

FIG. 6 illustrates a millimeterwave repeater and millimeterwave distributed antenna system having an MIMO structure. In the millimeterwave repeater and millimeterwave distributed antenna system, a signal input to a Donor_MIMO_#1 antenna 61, which is a first MIMO antenna, may be summed with an IF_A signal, a CM signal, a reference signal, a SYNC signal, and a power signal of a power supply unit 67 through a MIMO_#1_Module 610, which is a first signal processing module of a donor unit 63, and a signal corresponding to a result of the summation may be transmitted to a server unit 65 through a transmission unit 64. The signal received through the transmission unit 64 may be divided into the IF_A signal, the CM signal, the reference signal, and the Sync signal necessary for driving a MIMO_#1_Module 630, which is a first signal processing module of the server unit 65, and may be provided to a PLL or a Sync module, and the IF signal may undergo signal separation to be converted into an RF signal, and the RF signal may undergo suitable amplification and may be wirelessly transmitted to a user terminal 68 through RF amplification.

A signal input to a Donor_MIMO_#2 antenna 62, which is a second MIMO antenna, is processed through a MIMO_#2_Module 620, which is a second signal processing module of the donor unit 63, and an RF signal excluding a power signal may be transmitted to the server unit 65 through the transmission unit 64, which is a single line. The RF signal transmitted through the transmission unit 64 may be converted into an IF_B signal through a MIMO_#2_Module 640, which is a second signal processing module of the server unit 65, and the IF_B signal may undergo signal separation to be converted into an RF signal, and the RF signal may undergo suitable amplification and may be wirelessly transmitted to a user terminal 69 through RF amplification.

While the disclosure has been particularly shown and described with reference to exemplary embodiments thereof, it will be understood by one of ordinary skill in the art that various changes in form and details may be made therein without departing from the spirit and scope as defined by the following claims.

The invention claimed is:

1. A distributed antenna system using a millimeterwave repeater, the distributed antenna system comprising:
   a donor unit configured to receive a downlink millimeter band radio frequency (RF) signal from a gNodeB base station, sum a received RF signal with a communication signal and a synchronization (Sync) signal to generate a summation signal, and transmit the summation signal;
   a server unit configured to receive the summation signal, separate and amplify the summation signal, and transmit an RF signal to a user terminal;
   a first transmission line connected between the donor unit and the server unit; and
   a second transmission line connected between the donor unit and the server unit separately from the first transmission line,
   wherein only one of the donor unit and the server unit comprises a power supply unit configured to generate a power signal,
   wherein the power signal generated by the power supply unit is transmittable together with the summation signal through the first transmission line,
   wherein the donor unit comprises a first signal processing module and a second signal processing module for processing signals respectively received through a first multiple input multiple output (MIMO) antenna and a second MIMO antenna for MIMO,
   wherein the first transmission line receives the power signal and a first summation signal from the first signal processing module of the donor unit and delivers the power signal and the first summation signal to a first MIMO module of the server unit, and the second transmission line receives a second summation signal from the second signal processing module of the donor unit and delivers the second summation signal to a second MIMO module of the server unit, and
   wherein, the first summation signal includes a first RF signal received through the first MIMO antenna, and the second summation signal includes a second RF signal received through the second MIMO antenna, and the power signal is not transmitted in the second transmission line.

* * * * *